March 24, 1964   J. A. CHILMAN   3,125,960
PUMPING DEVICES
Filed Jan. 8, 1962
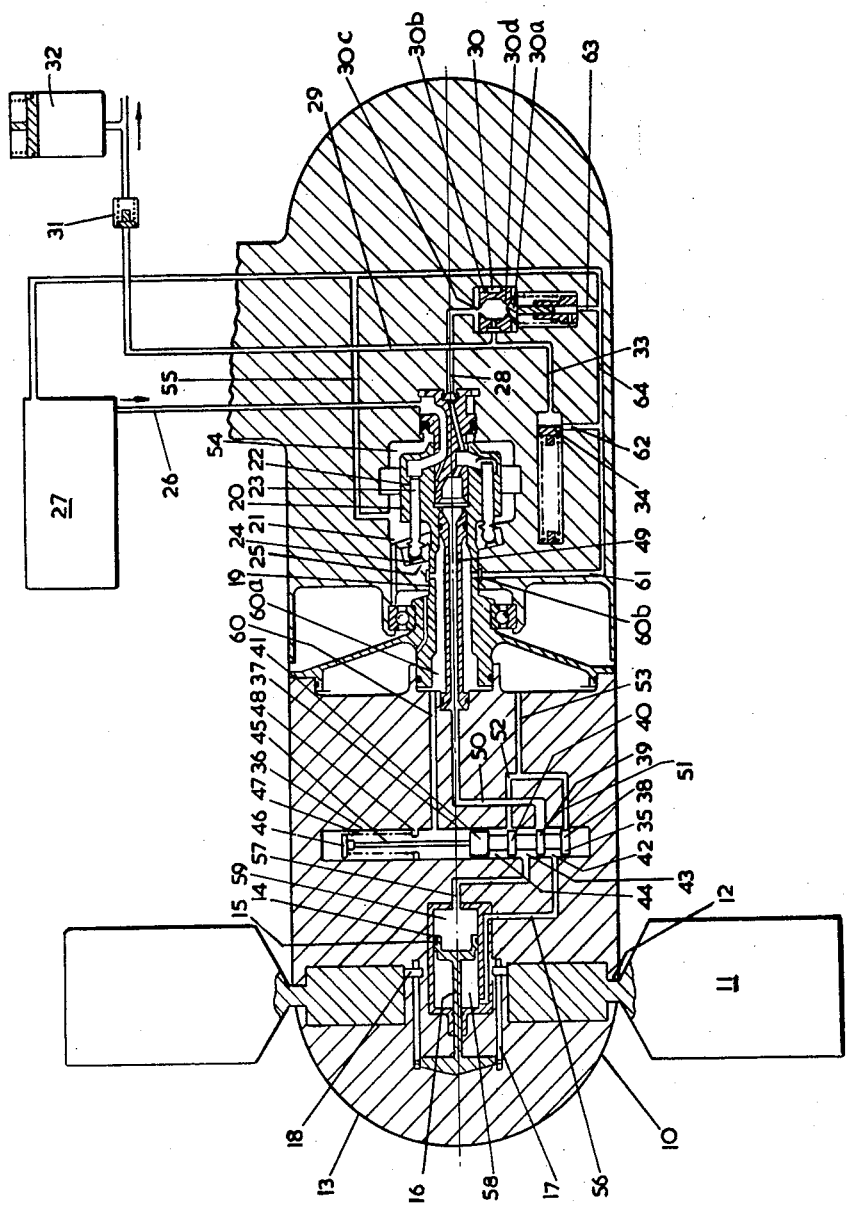
INVENTOR-
JOHN ALFRED CHILMAN
ATTORNEYS-
Reynolds & Christensen

United States Patent Office 3,125,960
Patented Mar. 24, 1964

3,125,960
PUMPING DEVICES
John A. Chilman, Clatter Grove, Painswick, England, assignor to Dowty Rotol Limited, Cheltenham, England, a British company
Filed Jan. 8, 1962, Ser. No. 164,909
Claims priority, application Great Britain Jan. 12, 1961
4 Claims. (Cl. 103—35)

This invention relates to pumping devices.

According to the invention a pumping device comprises a wind motor, a fluid-pressure pump connected to be driven by the wind motor, the wind motor having blades the pitch of which is adjustable, and means responsive to a delivery condition of the pump so that when the delivery condition has a predetermined value the pitch of the blades is changed.

Also according to the invention a pumping device comprises a wind motor, a fluid-pressure pump connected to be driven by the wind motor, a fluid-pressure motor connected to the blades of the wind motor for adjusting their pitch, a rotational governor including a fluid valve for controlling the supply of fluid from the pump to the fluid pressure motor and hence the pitch of the blades, the fluid valve having a first datum position corresponding to a first constant speed of rotation of the wind motor, and means responsive to a delivery condition of the fluid-pressure pump so that when the delivery condition has a predetermined value, the fluid valve is displaced from its first datum position to a second datum position corresponding to a second constant speed of rotation of the wind motor.

One embodiment of the invention will now be particularly described by way of example with reference to the accompanying diagrammatic drawing.

Referring to the drawing, there is shown diagrammatically a ram air turbine and pump unit, in axial section, for use in an aircraft, parts being shown in the first datum position. This unit is retractable into the aircraft structure when not in use. When extended into the slipstream of the aircraft the turbine of the unit is caused to rotate to operate the pump to provide fluid pressure for operation of certain aircraft services.

Ram air turbines of this kind are often used only in circumstances of emergency when internal power sources of the aircraft have failed.

The ram air turbine 10 comprises a number of blades 11 each of which is pivotally mounted at 12 in the hub 13 of the turbine. By virtue of their pivotal mountings 12 the blades are adjustable as to pitch by a fluid-pressure-operated motor 15. The piston 14 of the motor 15 is provided with a piston rod 16 which is connected through links 17 with crank pins 18 formed on the root portion of each blade. The ram air turbine 10 is connected by a shaft 19 to the rotatable cylinder barrel 20 of a fixed displacement swash-plate type fluid pump 21.

The rotatable cylinder barrel 20 is provided with a series of axially-directed and circumferentially-spaced cylinders 22 each of which contains a plunger 23. The outer end of each plunger engages a slipper 24 which in turn engages a common swashplate 25. The pump 21 draws its fluid through an inlet duct 26 from a reservoir 27, and delivers fluid under pressure into a duct 28 and through a duct 29 to the associated system, whereby devices such as brakes, flaps, etc. aboard the aircraft can be actuated. The duct 28 incorporates an unloading valve 30 while the duct 29 incorporates a non-return valve 31 positioned just up-stream of a branch line to an accumulator 32. The unloading valve 30 comprises a spring-loaded valve member 30a which co-operates with a displaceable spool 30b having an orifice 30c and a seating 30d for the valve member 30a.

A duct 33 is branched from the duct 29 and incorporates a high pressure relief valve 34.

The fluid-pressure operated motor 15 associated with the blades of the ram air turbine is controlled by a rotational governor which includes a spool valve 35 housed in a cylinder 36 which is transversely disposed across and within the hub 13 of the turbine. The longitudinal axis of the cylinder 36 is therefore disposed at right angles to, and intersects, the axis of rotation 37 of the turbine. Since the spool valve 35 is located at one side of that axis, it is subject to centrifugal displacement, in opposition to its spring 47.

The spool valve 35 includes four spaced lands 38, 39, 40 and 41 which between them define annular chambers 42, 43 and 44. The spool valve 35 is provided with a stem 45 extending beyond its point of intersection with the axis of rotation 37 towards the other end of the cylinder 36 and at its end portion is provided with a flanged abutment 46. The speeder spring 47, previously referred to, is interposed between the abutment 46 and an abutment 48 formed upon the inner wall of the cylinder 36.

The pump 21 is arranged to direct fluid under pressure through a duct 49 formed coaxially within the shaft 19 and through a further duct 50 to the cylinder 36. With the spool valve 35 in the position as shown in the drawing the land 39 registers with the adjacent end of the duct 50. Also, the lands 38 and 40 respectively close the ends of drain ducts 51 and 52 taken from the cylinder 36, which ducts 51 and 52 unite into a common line 53, which is in communication with the low pressure and exhaust zones 54 of the casing of the pump 21. These zones are in communication through a further duct 55 with the reservoir 27.

The annular chambers 42 and 43 formed between the lands 38, 39 and 40 are respectively in communication through ducts 56 and 57 with chambers 58 and 59 respectively, to the left and righthand sides in the drawing of the piston 14 of the fluid-pressure-operated motor 15. That part of the cylinder 36 surrounding the stem 45 of the spool valve 35 is in communication through a duct 60 with a further duct 60a co-axial with the duct 49 in the shaft 19. The duct 60a is in turn in communication through a suitable muff 60b with a duct 61 which communicates with the duct 55.

The high pressure relief valve 34 is arranged to discharge through a branch duct 62 which connects with the duct 61. Further, a branch duct 63 from the underside of the unloading valve 30, connects with the duct 61. A calibrated orifice 64 although large enough to pass full pump flow when there are no additional restrictions, is incorporated in the duct 61 and positioned at a point intermediate the junctions of ducts 62 and 63 with the duct 61.

The operation of the ram air turbine and pump unit will now be described.

Initially, upon extending the unit into the slipstream from the stowage zone of the aircraft, the blades 11 of the ram air turbine are already in coarse pitch, that is in a position in which they offer the least resistance to air flow. As the turbine commences to rotate, the pump also commences to rotate and thereby draw fluid from the tank 27 through the duct 26 and to discharge fluid under pressure through the duct 28, and through the orifice 30c of the spool 30b of the unloading valve 30, into the supply duct 29. The unloading valve 30 is a low pressure unloading valve and is intended to operate during starting of the unit to off-load pressure by relieving past the member 30a to the drain line 61. Such operation is necessary during starting to prevent the pump from stalling the turbine, under excessive hydraulic loading. Since the spool 30b, by virtue of its orifice 30c, is flow-responsive, this pressure relieving facility is effectively provided.

It will be understood that with increase of delivery pressure from the pump, the spool 30b is displaced progressively to increase the loading in the spring of the valve member 30a.

As the speed of the ram air turbine and pump further increases, the spool valve 35 is displaced by centrifugal force radially outwardly in the cylinder 36 against the effort of the speeder spring 47. During this movement the land 38 passes over and beyond the end of the duct 56 adjacent the cylinder 36 and the land 39 passes over and beyond the end of the duct 57 adjacent the cylinder 36. This has the effect of closing-off the duct 57 to pressure fluid from the duct 50 and opening the duct 56 to pressure fluid from the duct 50. Thus, pressure fluid is no longer delivered to the coarse pitch chamber 59 of the motor 15, but instead is delivered to the fine pitch chamber 58, the chamber 59 being placed in communication with the drain duct 52 through the annular chamber 43. In the example being described the change-over point in which the blades 11 are so caused to commence to move in the pitch fining direction is at approximately 1000 r.p.m.

The width of the land 39 is somewhat less than the diameter of the end opening of the duct 50 into the cylinder 36. Thus, when the speed of the ram air turbine and pump has increased further to a predetermined datum speed, that is a first datum speed under pump on-load conditions, the land 39 is disposed intermediate the diameter of the end opening of the duct 50 so that fluid flow to the motor 15 is such that the piston 14 of the motor is held stationary. The ram air turbine will then be constant-speeding, with the spool valve 35 at a first datum position. In the drawing the spool valve 35 is shown in its first datum position, with the land 39 disposed intermediate the diameter of the end opening of the duct 50.

If the speed of the ram air turbine and pump increases beyond the first datum speed, then the spool valve 35 is so displaced under centrifugal loading, that the land 39 moves with respect to the end opening of the duct 50 to permit greater flow to the chamber 59 of the motor 15 to accordingly coarsen the blades. At the same time the land 38 is positioned with respect to the duct 51 to permit correspondingly greater flow to the drain duct 51 from the chamber 58 of the motor 13. Conversely, if the speed of the ram air turbine and pump falls away below the first datum speed then the valve 35 is displaced radially inwardly such that the land 39 permits greater flow of fluid to the chamber 58 of the motor so that the blades assume a finer pitch, the land 40 being positioned to permit a corresponding flow of fluid to the drain duct 52 from the chamber 59. In the above way the speed of the ram air turbine and pump is returned to its first datum value.

By virtue of the areodynamic power imparted during constant speed operation from the slipstream of the aircraft through the intermediary of the turbine 10 to the pump 21, the accumulator 32 becomes fully charged and the system is provided with its pressure and flow requirements.

Upon the attainment of a delivery pressure of 3000 lbs. per square inch, the relief valve 34 cracks open and commences to relieve pressure such that pressure fluid enters the duct 62 and the return duct 61. By virtue of the calibrated orifice 64, a pressure is maintained in the duct 61 and is conveyed through the ducts 60a and 60 to that part of the cylinder 36 surrounding the stem 45 of the spool valve 35. This pressure is such that the spool valve 35 is further displaced away from its first datum position in a radially-outwardly direction and against the effort of the speeder spring 47 until the land 39 is positioned such that the annular chamber 43 is opened fully to the duct 50 so that maximum flow of pressure fluid is directed through the coarse pitch duct 57 to the chamber 59. At the same time fluid in the chamber 58 is exhausted through duct 56, annular chamber 42 and duct 51 to drain. Thus, the blades 11 of the turbine are moved to a coarser pitch setting.

The speed of the turbine falls off due to coarsening in the pitch of the blades. A number of other results follow. For one, the pressure drop through orifice 64 becomes less due to the lessening flow through it; this pressure drop is reduced as a square of speed. For another, the valve 35 moves inwardly under the pressure of its spring 47, for since the orifice 64 is always open there is no hydraulic barrier to such inward movement of valve 35, the appropriate volume of fluid caused by its inward movement spilling through the orifice back to tank 27. Such inward movement of valve 35 proceeds until the land 39 registers with the end opening of the duct 50. Thus, with the valve 35 in this new position, that is a second datum position, the ram air turbine constant speeds in its new pump off-loading coarser pitch at a second datum speed. Under these conditions and with the non-return valve 31 closed, the pressure developed by the pump 21 is sufficient to maintain the relief valve 34 open with fluid spilling through it such that the fluid pressure is maintained upon the inner end of the valve 35.

By so off-loading the pump by changing the pitch of the blades of the wind motor, no complex off-loading mechanism is necessary within the pump itself and since when the pump is off-loaded the power input to the pump is low, unnecessary heating of the fluid within the pump is obviated.

When the demands in the system are such that it is necessary to bring the unit back on to full load, the pressure differential across the non-return valve 31 will be such that the pump pressure will open the valve 31 and the resultant drop in pressure at the relief valve 34 will cause the relief valve to close over the end of the duct 62. Hence, the fluid-pressure acting upon the end of the valve 35 will be reduced to drain pressure. The valve 35 will, therefore, be displaced radially-inwardly under the effort of the speeder spring 47 in opposition to the centrifugal loading such that the land 39 permits passage of pressure fluid from the duct 50 through the annular chamber 42 into the fine pitch duct 56. At the same time the coarse pitch duct 57 is placed in communication with the drain duct 52. Thus the blades 11 of the turbine are moved in the pitch-fining direction.

As the turbine increases in speed in consequence, the valve 35 is displaced radially outwardly under centrifugal force against the effort of the speeder spring 47 until the turbine reaches the first datum speed for on-load pump operation.

When it is desired to discontinue the use of the ram air turbine and pump unit, the unit is retracted into the stowage zone of the aircraft. As this occurs the turbine runs down towards its stationary condition and since there is virtually no centrifugal force acting upon the spool valve 35, the speeder spring 47 displaces the spool valve 35 in the cylinder 36 such that the land 39 is positioned to direct the fluid finally pumped through the duct 50 and through the annular chamber 42 across to the coarse pitch duct 57. Thus, the blades move into their coarse pitch setting and are held there in readiness for restarting, this whilst the unit is retracted.

It will be understood that a ram air turbine and pump unit as hereinbefore described is provided in an aircraft for emergency use and may be brought into operation under conditions of failure of the normal operating system of the aircraft.

I claim as my invention:

1. A pumping device comprising a wind motor having blades, a fluid-pressure pump connected to be driven by the wind motor, a fluid pressure motor connected to the blades of the wind motor for adjusting their pitch, a rotational governor including a fluid valve for controlling the supply of fluid from the pump to the fluid pressure motor and hence the pitch of the blades, the fluid valve having a first datum position corresponding to a first constant speed of rotation of the wind motor and to a pump-on load conditions, and means responsive to a delivery condition of the fluid-pressure pump so that when the delivery condition has a predetermined value, the fluid valve is displaced from its first datum position to a second datum position corresponding to a second constant speed of rotation of the wind motor, and to a pump off-load condition.

2. A device of the character described comprising, in combination, a rotative wind motor having adjustable-pitch blades, a fluid pressure pump connected to be driven by the wind motor, a fluid pressure motor connected to the blades of the wind motor for adjusting their pitch, and hydraulically connected to the pump to be itself adjusted thereby, a rotational governor including a fluid valve spring-urged in one direction and mounted transversely with respect to and offset to one side of the axis of the wind motor, for rotation therewith, for displacement in the opposite direction by centrifugal force, said valve being arranged to control the supply of fluid from the pump to the fluid pressure motor and hence to control the pitch of the blades, the fluid valve having a first datum position corresponding to a first constant speed of rotation of the wind motor and to a pump on-load condition, and fluid pressure operated means responsive to a different delivery condition of the fluid pressure pump, which means is arranged to apply a displacing force to the fluid valve, to displace the valve from its first datum position to a second datum position corresponding to a second constant speed of rotation of the wind motor and to pump off-load condition.

3. A device as in claim 2, including further a relief valve which is subjected to pump delivery pressure, and arranged to open during pump off-load conditions, and incorporated in the hydraulic connections between the pump and the fluid pressure motor, to direct the pressure fluid to the fluid valve to move the latter in opposition to its spring-loading, and restrictor means in the hydraulic connections downstream of said relief valve and arranged to permit a controlled leakage of fluid from the fluid directed to the fluid valve, and to direct such leakage to drain.

4. A device of the character described comprising, in combination, a rotative wind motor having adjustable-pitch blades, a fluid pressure pump connected to be driven by the wind motor, a fluid pressure motor connected to the blades of the wind motor for adjusting their pitch, hydraulic duct means connecting the motor to the pump to adjust the motor by means of pressure fluid from the pump, a rotational governor including a fluid valve spring-urged in one direction and mounted transversely with respect to and offset to one side of the axis of the wind motor, for rotation therewith, for displacement in the opposite direction by centrifugal force, said valve being interposed in the hydraulic duct means between the pump and the fluid pressure motor to control the fluid supply to the fluid pressure motor, and hence to control the pitch of the blades, the fluid valve having a first datum or fine-pitch position corresponding to a first constant speed of rotation of the wind motor and to a pump on-load condition, and fluid pressure operated means, including a relief valve and a calibrated orifice downstream from the relief valve in a return duct of the hydraulic connections of the pump, said fluid pressure operated means being responsive to a different delivery condition of the fluid pressure pump, and arranged to apply a displacing force to the fluid valve, to displace the valve from its first datum position to a second datum or coarse-pitch position corresponding to a second constant speed of rotation of the wind motor and to a pump off-load condition.

References Cited in the file of this patent

UNITED STATES PATENTS

| | | |
|---|---|---|
| 2,310,994 | Ring | Feb. 16, 1943 |
| 2,518,925 | Nussbaum | Aug. 15, 1950 |
| 2,525,694 | Lindsey et al. | Oct. 10, 1950 |
| 2,688,285 | Stockett et al. | Sept. 7, 1957 |
| 2,977,071 | Plotkowiak | Mar. 28, 1961 |